(No Model.)

J. C. SEBRING.
SEED PLANTER.

No. 250,845. Patented Dec. 13, 1881.

WITNESSES
A. B. Robertson.
R. Robertson.

INVENTOR
Joseph C. Sebring
per T. J. W. Robertson
ATTORNEY.

UNITED STATES PATENT OFFICE.

JOSEPH C. SEBRING, OF BISMARCK, KANSAS.

SEED-PLANTER.

SPECIFICATION forming part of Letters Patent No. 250,845, dated December 13, 1881.

Application filed July 28, 1881. (No model.)

*To all whom it may concern:*

Be it known that I, JOSEPH C. SEBRING, a citizen of the United States of America, residing at Bismarck, in the county of Wabaunsee and State of Kansas, have invented certain new and useful Improvements in Seed-Planters; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to an improvement in revolving disks for seed-planters; and it consists in the peculiar construction and arrangement of the parts, as hereinafter described, and then pointed out in the claims.

Figure 1:
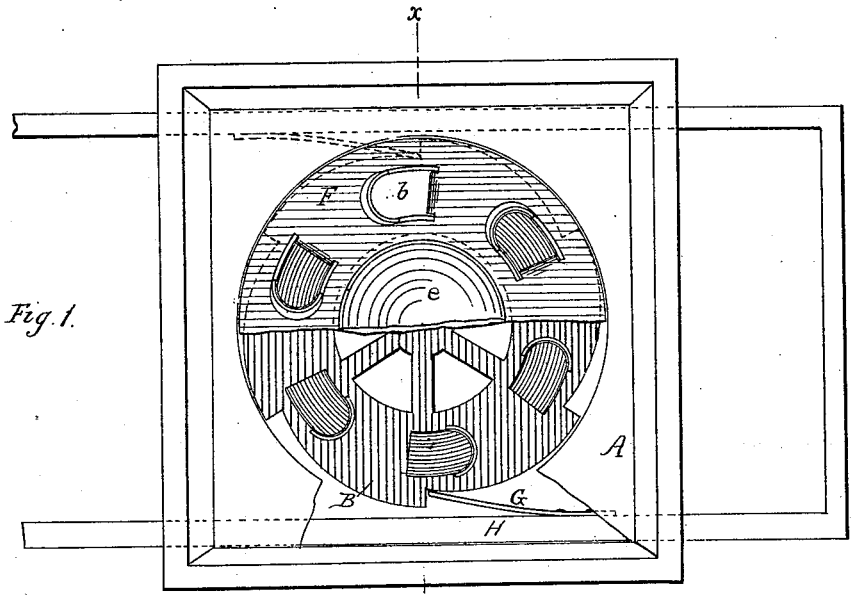
Figure 2:
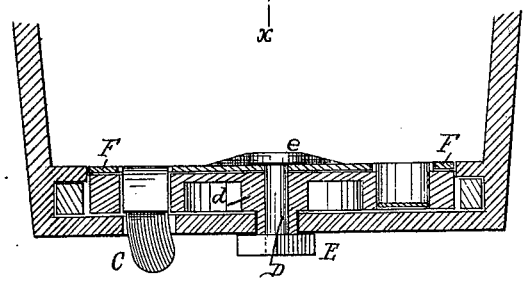

In the appended drawings, Figure 1 shows a plan of a seed-box provided with a disk constructed according to my improvement, with part of the adjusting-plate broken away. Fig. 2 is a sectional view through the line x x, and Fig. 3 is a detail showing a dropping bottom to the seed-cups.

A represents the seed-box, which may be made in any approved form; but I prefer that it be made with a recess deep enough to receive the disk and the adjusting-plate, so that the top of the plate and the bottom of the seed-box be flush with each other.

Figure 3:
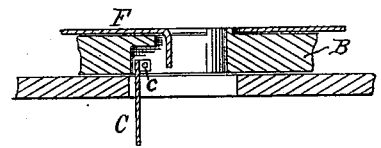

At B is shown the distributing-disk, provided with the cups b, each having a dropping bottom, C, hinged thereto, as shown at c in Fig. 3. This disk has a hub, d, provided with a shoulder, which rests on the bottom of the recess, and through this hub and recess is passed a bolt, D, having a nut, E, which nut screws tight against the bottom of the hub and loosely against the bottom of the seed-box. The top of the bolt may have either a large head, e, as shown, or a small head and a loose plate or washer of the size of the head of the bolt, as shown in the drawings; or the plate may be secured fast to the head, if preferred. This bolt has the twofold function of securing the disk in place and of fastening the adjusting-plate F in the desired position upon the disk, and the head of said bolt (or the plate, if one is used) is made large enough to keep the adjusting-plate in contact with the disk all the way round. By this construction the adjusting-plate F can be readily secured and held in any desired position by the same bolt that holds the disk in place, without the use of the additional bolts or screws heretofore considered necessary; and, moreover, the adjustment by means of the central bolt is much more convenient than the ordinary devices used for this purpose.

The dropping bottom C will be found especially advantageous in slow-moving planters, because it is held up by the bottom of the seed-box until the cup is in the right position to drop the seed, when the bottom immediately falls, thus dropping the seed in the proper place and preventing its falling in an improper one. After the seed has been dropped the bottom is raised to its proper position by coming in contact with the edge of the aperture in the seed-box, and is retained there until the cup comes around over the aperture again, when it is dropped, as before. Should, however, the planter stop, for any reason, with the cup partially over the aperture, the seed would not fall out of the cup, and it would thus be prevented from falling in an improper place.

Motion is given to the disk by means of springs G, one of which is attached to each side of the operating-slide H, to which motion is given in any suitable manner.

I do not wish to limit myself to the use of this dropping bottom, as the method of securing and adjusting the plate may be used without said dropping bottom, or the dropping bottom may be used without the means of fastening the adjusting-plate.

If preferred, the hub may be dispensed with by using a bolt inserted from below and having a shoulder, on which the disk rests, said bolt screwing into the adjusting-plate or into a plate or nut above it. This is merely an obvious modification of the arrangement shown in the drawings.

What I claim as new is—

1. In combination with the seed-receptacle of a planter, the disk B, adjusting-plate F, and central bolt, D, the disk and bolt being constructed substantially as described, whereby the bolt will both clamp the adjusting-plate tight upon the disk and hold the disk and plate loosely in the seed-receptacle, as set forth.

2. The combination, with the seed-receptacle of a planter, of the disk B, provided with a hub, d, passing through the bottom of the seed-receptacle, of the adjusting-plate F, and central bolt, D, whereby the bolt both clamps the plate tight upon the disk and holds the disk loosely in the seed-receptacle, substantially as described.

3. The combination, with the seed-receptacle of a planter, of the rotating disk B, provided with the dropping bottoms C, each having one end hinged to the seed-cup and its other end supported horizontally by one edge of the discharge-opening, whereby the bottom is suddenly dropped and then gradually raised by the edge of the discharge-opening opposite to that which supported the free end of the dropping bottom, substantially as described.

4. The combination, with the seed-receptacle of a planter, of the rotating disk B, provided with a circular series of openings, and the hinged bottoms C, adapted to fit in said openings, and supported at their free ends until the opening in the disk and the discharge-opening in the seed-receptacle register with each other, substantially as described.

In testimony whereof I affix my signature in presence of two witnesses.

JOSEPH C. SEBRING.

Witnesses:
T. J. W. ROBERTSON,
GEO. F. GRAHAM.